July 27, 1965 A. H. SCHMELTZ 3,196,762
METHOD OF MAKING CONTAINERS
Filed Oct. 8, 1964

INVENTOR.
ANDREW H. SCHMELTZ
By
Howard B. Funk
Attorney

United States Patent Office 3,196,762
Patented July 27, 1965

3,196,762
METHOD OF MAKING CONTAINERS
Andrew H. Schmeltz, Oakmont, Pa., assignor to Aluminum Company of America, Pittsburgh, Pa., a corporation of Pennsylvania
Filed Oct. 8, 1964, Ser. No. 407,610
3 Claims. (Cl. 93—94)

This application is a continuation-in-part of application Serial No. 240,929, filed November 29, 1962, now abandoned.

This invention relates to the manufacture of spirally wound fiber container bodies including a metal foil inner surface or lining and is particularly concerned with sealing the inner spiral seam to render the container bodies seepage-proof.

Spirally wound fiber or paper containers with metal ends and an impervious metal foil lining, adapted for the packaging of unit amounts of various bulk materials for shipment, storage and eventual retail sale are well known. They are presently manufactured in large numbers by winding strips of the lining and the body paper stock on the mandrel of a helical or so-called spiral winding machine to form a continuous elongated tube which is cut into individual container body lengths. The paper stock is usually of a relatively strong and inexpensive kind, such as kraft paper, chipboard or cardboard, and several layers thereof are ordinarily used to provide the desired stiffness and rigidity to the container bodies. The lining is usually aluminum foil by preference of the art. It may be furnished as a foil-paper laminate which is wound as the initial layer on the mandrel with its foil side facing inwardly. However, such containers have presented a serious problem in connection with capillary seepage, known as "wicking," at the internal spiral seam which, in time, leads to unsightliness and body deterioration inimical to salability and shelf-life when the container content is of a liquid or unctuous nature. Hence, it is necessary to cure this wicking problem effectively and economically in order to enhance the value and usefulness of such containers, but previous methods attempting to accomplish this end have not proved to be fully satisfactory and free from defects and disadvantages.

It has been recognized that container bodies of the type above described can be effectively rendered seepage-proof by a narrow, metal foil tape sealed to the foil face of the liner in spanning relation to the spiral seam continuously along the length thereof. However, the metal foil tape must be laid upon the winding mandrel accurately and smoothly under the requisite conditions of speed and tension. The fragile nature of narrow metal foil tape, including its susceptibility to rupture under such conditions, creates the problem to which my invention is addressed.

Accordingly, an object of the invention is the provision of a satisfactory method of sealing the internal spiral seam of spirally wound container bodies by a sealing tape entirely of metal foil, preferably aluminum foil, during the formation of container body tubing having a metal foil interior lining strip. Such lining strip may be entirely metal, or a metal foil laminated with a backing material, such as paper, prior to formation of the container body tubing. Irrespective of the foil lining strip being entirely metal or a foil laminate, the foil face to be exposed in the finished tubing is called the foil face of the lining.

Another object of the invention is to utilize the strength of the liner strip to offset the inherent weakness of the foil tape for transport of the tape to the spiral winder without rupture or tape imposed restriction on the speed and tension conditions in operation of the winder.

A particular object of the invention is to provide for the application of the sealing tape to the lining strip in such manner before they are wound on the mandrel of a spiral tube winder that the tape for a suitable part of its width is adhered or bonded to the foil face of the lining strip along the trailing or rear edge of said strip, as wound on the mandrel, so as to effect delivery of the fragile foil tape to the mandrel in a fixed, edge margin projecting relationship to the lining strip and to assure proper positioning of the tape in spanning or lapping relation to the formed seam between the successive spiral turns of the lining strip as wound into elongated tubular form on the mandrel.

The foregoing and other objects and advantages of the invention will become apparent from a consideration of the following detailed description of a preferred embodiment thereof taken in conjunction with the accompanying drawing, in which.

Figure 2:
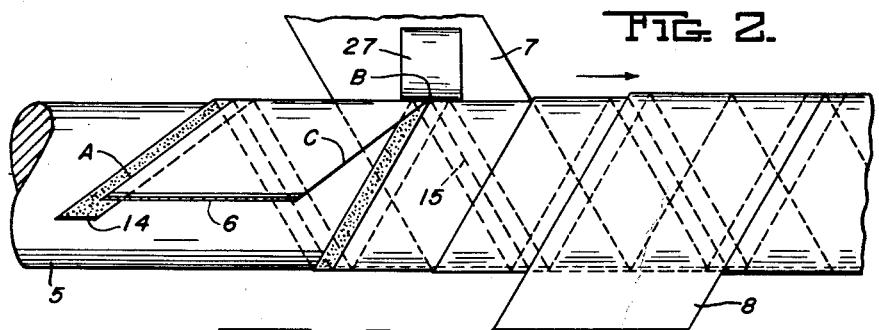
FIG. 2 is a diagrammatic view of a portion of the mandrel illustrating the method of forming the tape sealed tubular liner thereon with a butt joint between the convolutions and the build-up of several successive paper body forming layers thereon.

Referring now to the drawing, 5 indicates the fixed mandrel of a spiral winding machine onto which mandrel lining strip 6 and the paper body strips 7 and 8 are drawn under tension at an angle and spirally wound in successive layers, as shown in FIG. 2, to form a spirally wound tube. Such winding machines are well known in the art and the details thereof, including the endless drive belt which draws the strips onto the mandrel, applies pressure to the successive layers and advances the tube along the mandrel in the direction of the arrow, need not be illustrated. Preferably, for tube wall smoothness, which will facilitate sealing of the finished containers produced therefrom with end closures, all of the strips are wound with a butt or edge-to-edge seam between their successive convolutions and the seams of the layers are out of register or staggered. Also, by means of the usual adhesive appliers, not shown, the body strips 7 and 8 are coated on their inner faces with a suitable overall adhesive so that under the belt pressure they are adhered to each other and to the lining strip 6 to form a unitary body wall.

Figure 3:
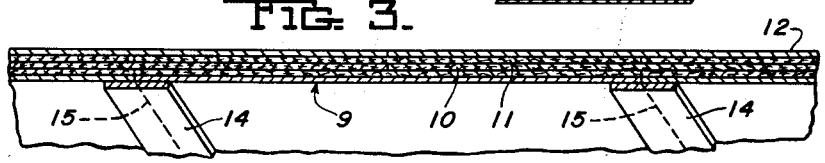
FIG. 3 is a fragmentary view illustrating the construction of the tubular side wall of a completed container body and showing the laminated layers of materials thereof exaggerated in thickness for clarity of illustration and, to avoid confusion, omitting the adhesives which face bonds them together in unitary assembly.

The completed container body wall, as shown in FIG. 3, includes the inner metal foil lining layer 9, the intermediate paper body layers 10 and 11 and an outer layer 12 of foil, paper or other material suiably printed and/or ornamented, as desired, to serve as a label. This label wrapping may be put on the body tube at the time of its information or, as a matter of choice, applied to the containers after they have been filled and sealed. It will also be seen that the lining layer 9 includes a narrow sealing tape 14 entirely of metal foil which laps or spans the spiral seam 15 at the exposed or inner face of the lining. This tape is bonded to the foil face of the lining continuously along the seam of the purpose of eliminating capillary seepage or wicking through the seam from the contents of the container.

Figure 1:
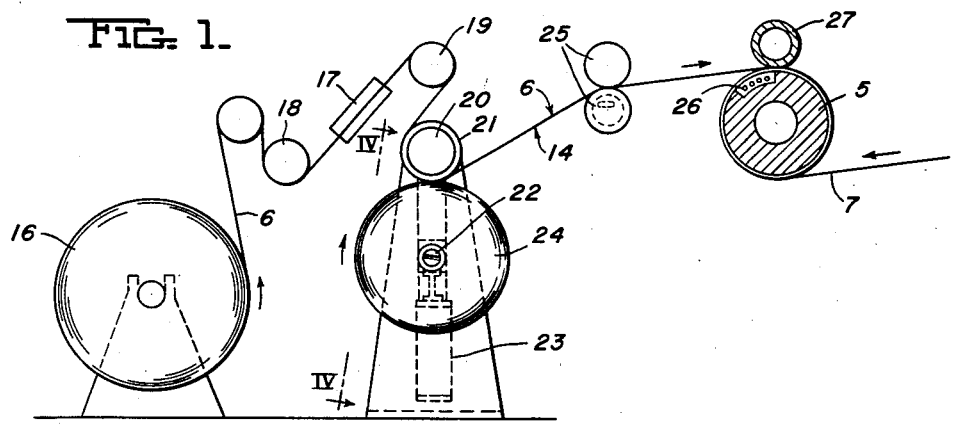
FIG. 1 is a diagrammatic view of an apparatus suitable for practicing the invention and illustrating the manner of juxtaposing and adhesively bonding the fragile metal foil sealing tape in edge margin projecting relationship to the foil face of the lining strip during their movement to the mandrel of a spiral tube winder where they are wound into elongated tubular form.

In accordance with the present method invention, the tape is applied and bonded to the foil face of the lining strip in edge-margin projecting relation to the liner strip before they reach the mandrel. As is shown in FIG. 1, the liner strip 6, which preferably is a laminate of paper and aluminum foil having a commercial gage or thickness of between 0.00025 and 0.0005 inch, with handling strength provided by its paper backing, is withdrawn from a supply roll 16. This strip is passed through a tensioning drag 17 for tensioning it in the usual manner, with suitable guide rolls 18 and 19 fore and aft of the drag, and then about a tape feed roll 20. This roll is wider than the width of strip 6 and is preferably faced with relatively soft rubber or other suitable material 21 adapted to provide relatively high surface friction contact with metal foil and paper materials in engagement therewith. Thus, roll 20 is adapted to be rotated by the strip 6, the paper side of which is in contact with the roll, and the foil side of the strip 6 faces outwardly, or downwardly as viewed in FIGS. 1 and 2.

Figure 4:
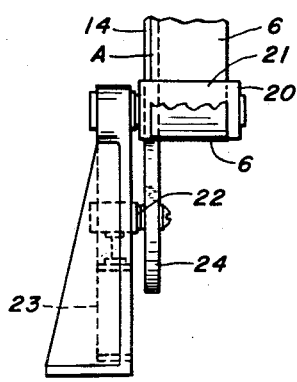
FIG. 4 is a detail view taken on the line IV—IV of FIG. 1.

Co-operable with the tape feed roll 20 is a movable spindle 22, parallel to the axis of tape feed roll 20 and mounted for bodily movement toward and away from the roll 20, as by means of an air cylinder 23. A supply roll 24 of the metal foil tape 14 is adapted to be mounted on spindle 22 and constantly held in peripheral surface engagement with the feed roll 20 by air pressure admitted into air cylinder 23. The foil tape roll, as mounted on the spindle, is disposed in such position that a portion of the width of the tape bears on the foil face of the liner strip 6 and the remaining portion of the tape projects outwardly from one edge of the liner strip and is in pressure engagement with the feed roll 20 under the influence of the pressure cylinder 23, as is shown in FIG. 4. For low cost, the tape is preferably aluminum foil of a width between about .375 inch and about .625 inch and of between about 0.00045 inch and about 0.0025 inch in thickness, use of a foil from the lower end of the width and thickness ranges being preferred for the advantage in cost savings it affords. It will be seen that the liner strip 6 is utilized to effect unwinding of the fragile foil tape 14 from its supply roll 24 with the tape substantially freed from tractive effort to rotate the tape supply roll, thereby successfully effecting tape feed and minimizing danger of tape rupture despite its fragility and its susceptibility to easy tearing.

Substantially immediately after the liner strip 6 and the tape 14 leave the roll 20 their lapped portions are adhesively bonded or sealed to each other to retain the tape in projecting relation to the edge of the strip. For effecting the bonding, the face of the tape which contacts the liner strip has a relatively low temperature (150° F. to 250° F. softening point) heat-sealable thermoplastic bonding or sealing coating thereon, suitably of polyamide resin or plasticized vinyl copolymer or the like. Heat is applied to the tape to render the seal coating tacky and pressure is applied to seal the tape to the edge margin of the liner strip which it underlaps along the strip edge A as the two travel between pinch rolls 25. One of these rolls may be maintained at the desired tape heating temperature, as by an electric or gas heater therein, as indicated, or by heating the tape ahead of the pinch rolls, as desired.

From the rolls 25, the combined or unitary tape-lining strip passes to the top side of the mandrel and is spirally wound about the same into a liner tube formation with the spiral seam 15 between contiguous strip convolutions and with the tape and foil face of the strip on the inside of the liner tube. However, it is to be recognized that, by a mere reversal of parts, the tape and lining strip can be combined foil side up and passed to the lower side of the mandrel so as to face inwardly in the formed liner tube. As is clearly shown in FIG. 2, edge A of the liner strip along which the tape has been sealed is the trailing edge of the inner strip as wound on the mnadrel. Hence, at the seam forming point B on the mandrel, the incoming liner strip at its leading edge C will overlay the portion of the tape which projects from the trailing edge of the immediately preceding strip convolution, the fixed relation of the tape to the lining strip positively assuring that the tape will span or lap the formed seam 15. These overlapped portions of the tape and the strip are hermetically sealed to each other by applying heat and pressure thereto. Appropriately, heat may be applied to the tape just ahead of combining point B, as by an electric heater 26 embedded in the mandrel, or by suitably directing heat against the exposed surface of the tape close to point B, and sealing pressure may be applied by a presser roll 27 at the combining point B.

By the procedure above described, the fragile joint sealing foil tape is continuously unwound from its supply roll and applied and sealed to the foil face of the liner strip in projecting relation along the trailing edge of the strip. The two are delivered as a unitary tape-liner strip to the mandrel and spirally wound thereon with the liner strip absorbing the delivery and winding tension. The foil surface of this tape-liner strip contacts the mandrel which puts the tape inside the liner tube formation and under the margin of the leading edge of the incoming strip at its seam forming point with the trailing edge of the preceding strip convolution on the mandrel so that the seam is spanned or lapped by the sealing tape. Then, at the seam forming point, the overlapped portions of the tape and the lining strip are heat sealed and integrally connected together to complete the tape seal over and along the spiral seam of the liner tube. Over this completed tape-sealed, liner tube or lining layer 9, the paper body forming strips 7 and 8 are spirally wound in successive layers and all of the layers adhesively laminated together, as heretofore indicated, thus progressively forming the continuous unitary container body tube having the spiral seam of its metal foil inner surface or lining tape-sealed against seepage along the entire seam length. By supplying the foil tape and the foil bearing lining strip from separate supply rolls and bonding them together in the edge-margin projecting relationship, relative displacement between the tape and liner strip is prevented during delivery and winding thereof on the mandrel and further positively insures the accurate positioning of the tape under and in spanning relation to the spiral seam of the formed liner.

The foil surface of both the tape 14 and the lining strip 6 contact the stationary mandrel 5 during the winding operation and to enable them to slip readily on the mandrel they are preferably provided with a dry slip coating preferably of vinyl resin, or other appropriate thermoplastic resin material, and wax applied from solvent solution and dried in the usual manner. In addition to affording slip on the mandrel, this coating serves to seal microscopic pores in the extremely thin foil of the foil-paper laminate strip 6. The softening point of the slip coating exceeds that of the heat seal coating on the opposite side of the foil tape 14 by about 50° F., so that the tape is readily heat sealed to the liner strip without softening the slip coating which otherwise would develop a tendency for them to adhere to the mandrel at the combining and sealing station B. The respective coating materials are well known in the art. Heat sealing the tape to the liner strip, seal coating to slip coating, produces gas and liquid tight bonding of the coated foils to each other, thereby making the container bodies cut from the foil lined paper tubing seepage-proof.

Figure 5:
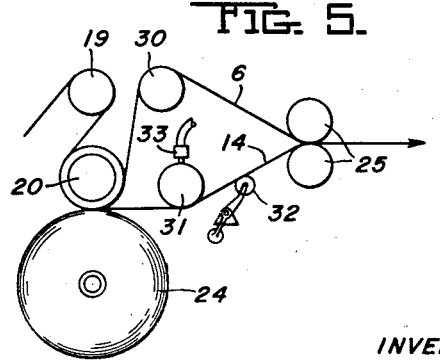
FIG. 5 is a view similar to FIG. 1, but showing a modification.

In the variation of the method shown in FIG. 5, the liner strip 6 and the tape 14 have slip coatings thereon, but the tape has no heat seal coating. As they leave the feed roll 20, they travel to the pinch rolls 25 in separated paths, strip 6 passing around idler roll 30 and thence to the pinch rolls and tape 14 passing under applicator roll 31 and thence to the pinch rolls. Between roll 31 and the pinch rolls 25, the tape may be engaged at its lower side by swinging roll 32 which is adapted to tension the tape at least sufficiently to keep its uncoated upper side in contact with the applicator roll 31. Through a drip pipe 33 from a supply container, not shown, a liquified moisture and oilproof adhesive drips onto the applicator roll 31 and is applied as a thin film coating on the upper surface of the tape. Before this adhesive coating dries, the tape is combined with the liner strip at the pinch rolls to adhere the two in the edge-margin projecting relationship for delivery to the mandrel and thereafter to adhere the projecting portion of the tape to the overlying leading edge portion of the liner strip at the seam forming point B on the mandrel. A volatile solvent may be used to liquify the adhesive to make it relatively quick-drying and easy to apply to the tape. If desired, the adhesive may be applied to the tape by brush or by spray. No heat need be applied to the combined tape and liner strip, unless desired, and the presser roll 27 may be dispensed with since the winding tension and the driving belt pressure on them and the superposed paper layers will press all of them into a compact, unitary tube structure ready for cutting into individual container body lengths.

It should be understood that my invention in its broader aspects is not limited to the afore-described modes of bringing into juxtaposition for adherence the metal foil tape and the liner strip so that following adherence the liner strip serves as the carrier web for transport of the metal foil tape to the winder. Thus, for example, the coils of metal foil tape and of liner strip may be carried by separate pay-off devices and fed without prior contact to such point of adherence to the liner strip. In such an arrangement, it is to be expected that the metal foil tape would be forwarded under sufficient tension between its pay-off device and such point of adherence to the liner strip to provide the well-known result of tracking control. The fragile nature of the metal foil tape would not prevent the use of such tension since its magnitude is greatly less than the magnitude of tension required at the winder.

Further, it should be understood that this invention in respect of dimensions of the metal foil tape to be transported to the winder is in its broadest aspects concerned with such tape of a fragility that it will not satisfactorily as a single intact web sustain the conditions of speed and tension required at the winder. Unless the width of the metal foil tape is materially less than one-half the width of the liner strip, the state of fragility, with which the invention is concerned, is not likely to exist.

Having thus described the invention and many of its advantages, it will now be apparent to those skilled in the art that various changes may be adopted without departing from the spirit and scope of the invention as defined in the appended claims.

What is claimed is:

1. In a method of producing spirally wound tubing from which container bodies are made, wherein a lining strip having a metal foil face is spirally wound on a mandrel under tension to form a continuous tubular liner with said foil defining the inner surface of said liner, the improvement in sealing and seepage-proofing the seam between successive convolutions of said tubular liner which comprises:
   (a) providing sealing tape entirely of metal foil having a width materially less than half the width of said lining strip and a thickness such that said tape is not capable as a single web of sustaining the winding tension at said mandrel, and having a heat sealable coating on one side thereof;
   (b) progressively heat sealing said tape along the foil face of said lining strip in projecting relation to one edge thereof at a point spaced from said mandrel, whereby the superior strength of said lining strip offsets the inherent weakness of said tape and delivers the tape intact onto said mandrel;
   (c) the tape bearing edge of said liner strip being the trailing edge thereof as engaged upon the mandrel thereby causing the projecting portion of said tape at the seam forming point on the mandrel to underlie the free edge margin of the incoming liner strip at said seam forming point, and
   (d) applying heat and pressure to said tape and said liner strip while on said mandrel to heat seal each to the other and complete the tape seal along the spiral seam of said tubular liner.

2. In a method of producing spirally wound tubing from which container bodies are made, wherein a lining strip of laminated metal foil and paper is spirally wound on a mandrel to form a continuous tubular liner with said foil defining the inner surface of said liner, the improvement in sealing and seepage-proofing the seam between successive convolutions of said tubular liner which comprises:
   (a) providing sealing tape entirely of metal foil having a width of between about 0.375 inch and about 0.625 inch and a thickness of between about 0.00045 inch and about 0.0025 inch, and having a heat sealable coating on one side thereof;
   (b) progressively heat sealing said tape along the foil face of said lining strip in projecting relation to one edge thereof at a point spaced from said mandrel, whereby the superior strength of said lining strip offsets the inherent weakness of said tape and delivers the tape intact onto said mandrel;
   (c) the tape bearing edge of said liner strip being the trailing edge thereof as engaged upon the mandrel thereby causing the projecting portion of said tape at the seam forming point on the mandrel to underlie the free edge margin of the incoming liner strip at said seam forming point, and
   (d) applying heat and pressure to said tape and said liner strip while on said mandrel to heat seal each to the other and complete the tape seal along the spiral seam of said tubular liner.

3. In a method of making spirally wound metal foil lined paper container bodies which are interiorly seepage-proof, the steps comprising:
   (a) drawing an impervious liner strip composed of a thin metal foil and paper backing laminate under tension to and spirally winding it on a mandrel to progressively form a tubular liner with said foil facing inwardly and with a spiral seam between the successive strip convolutions on the mandrel;
   (b) engaging the paper side of each said strip against a tape feed roll prior to said winding;
   (c) placing and maintaining a supply roll of narrow thin metal foil tape in peripheral contact partly with the foil side of said strip and partly with said feed roll so that a portion of the tape width laps the trailing edge margin of said strip as wound on the mandrel and the remainder of its width projects outwardly from said trailing edge margin, the strip contacting side of said tape in said supply roll having a heat-sealable thermoplastic coating;
   (d) applying heat and pressure to said lapped portions of said tape and said strip to seal them to each other prior to said winding so that said tape is drawn to and wound spirally about the mandrel by said strip with the tape spanning said seam;

(e) lapping the leading edge portion of the incoming strip over the projecting portion of the tape on the trailing edge of the preceding strip convolution at the seam forming point on the mandrel, and (f) applying heat and pressure to said overlapped portions of said tape and said strip to seal them to each other while on the mandrel and complete the tape seal along the spiral seam of the tubular liner.

References Cited by the Examiner

UNITED STATES PATENTS

| | | | |
|---|---|---|---|
| 1,854,297 | 4/32 | Garling | 93—80 |
| 3,159,515 | 12/64 | Dunlop et al. | 156—190 |

FRANK E. BAILEY, *Primary Examiner.*

UNITED STATES PATENT OFFICE
CERTIFICATE OF CORRECTION

Patent No. 3,196,762                                        July 27, 1965

Andrew H. Schmeltz

It is hereby certified that error appears in the above numbered patent requiring correction and that the said Letters Patent should read as corrected below.

Column 3, line 4, for "suiably" read -- suitably --; line 13, for "seam of" read -- seam for --; column 4, line 16, for "mnadrel" read -- mandrel --; same column, line 18, for "overlay" read -- overlap --.

Signed and sealed this 18th day of January 1966.

(SEAL)
Attest:

ERNEST W. SWIDER                                   EDWARD J. BRENNER
Attesting Officer                                        Commissioner of Patents